US011983219B2

(12) United States Patent
Bonasso et al.

(10) Patent No.: US 11,983,219 B2
(45) Date of Patent: *May 14, 2024

(54) INSTRUCTIONAL DESIGN TOOL

(71) Applicant: INTERNATIONAL BUSINESS MACHINES CORPORATION, Armonk, NY (US)

(72) Inventors: Jeffrey J. Bonasso, Pittsburgh, PA (US); Sara Giordano, Bari (IT); Rahul Gupta, Uttar Pradesh (IN); Kathryn Marietta-Tondin, Alexandria, AL (US); Janis A. Morariu, Hardy, VA (US); Devang D. Patel, Dublin, CA (US); Amy Purdy Hirst, Hyde Park, NY (US); Michael Reed, Pflugerville, TX (US); Antonella Vaccina, Bari (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1057 days.

This patent is subject to a terminal disclaimer.

(21) Appl. No.: 16/117,731

(22) Filed: Aug. 30, 2018

(65) Prior Publication Data

US 2018/0373806 A1 Dec. 27, 2018

Related U.S. Application Data

(63) Continuation of application No. 12/042,434, filed on Mar. 5, 2008, now Pat. No. 10,095,805.

(51) Int. Cl.
*G06N 5/025* (2023.01)
*G06F 8/10* (2018.01)
(Continued)

(52) U.S. Cl.
CPC ............... *G06F 16/84* (2019.01); *G06F 8/10* (2013.01); *G06N 5/02* (2013.01); *G06N 5/022* (2013.01);
(Continued)

(58) Field of Classification Search
CPC ........... G06N 5/02; G06N 5/022; G06N 5/025
See application file for complete search history.

(56) References Cited

U.S. PATENT DOCUMENTS 5,820,386 A 10/1998 Sheppard
6,169,992 B1 * 1/2001 Beall .................... G06F 16/951
(Continued)

OTHER PUBLICATIONS

"Java Basics" verified by wayback machine to 2005. [Online] Downloaded Aug. 4, 2021 http:/web.archive.org/web/20051218073559/ http://leepoint.net/javabasics/oop/oop-20-data-student.html (Year: 2005).*

(Continued)

*Primary Examiner* — Ben M Rifkin
(74) *Attorney, Agent, or Firm* — Dan Yeates; Andrew M. Calderon; Calderon Safran & Cole, P.C.

(57) ABSTRACT

An instructional design tool is provided for designing learning based applications. More specifically, the instructional design tool is configured to use captured expert knowledge for translating such knowledge into an environment used for instructional purposes. The instructional design tool includes at least one component configured to visually model a gaming scenario using recorded knowledge and graphical content defined by values associated with classes of respective models and translate the defined values into a standardized XML format.

23 Claims, 17 Drawing Sheets

(51) Int. Cl.
*G06F 16/84* (2019.01)
*G06N 5/02* (2023.01)
*G06N 5/022* (2023.01)
*G09B 19/00* (2006.01)

(52) U.S. Cl.
CPC ......... *G06N 5/025* (2013.01); *G09B 19/0053* (2013.01)

(56) References Cited

U.S. PATENT DOCUMENTS

| | | | | |
|---|---|---|---|---|
| 6,438,560 | B1* | 8/2002 | Loen | G06F 16/289 707/769 |
| 6,498,920 | B1 | 12/2002 | Simon | |
| 2001/0047274 | A1 | 11/2001 | Borton | |
| 2002/0002586 | A1* | 1/2002 | Rafal | G06Q 10/107 709/205 |
| 2002/0059425 | A1* | 5/2002 | Belfiore | G06F 16/256 707/E17.032 |
| 2002/0099581 | A1* | 7/2002 | Chu | G06Q 30/02 707/600 |
| 2002/0133384 | A1 | 9/2002 | Dimitruk et al. | |
| 2003/0028498 | A1* | 2/2003 | Hayes-Roth | G06N 3/006 706/17 |
| 2004/0067469 | A1* | 4/2004 | Rogan | G09B 7/00 434/107 |
| 2006/0204943 | A1* | 9/2006 | Kimball | G09B 7/02 434/307 R |
| 2007/0180126 | A1* | 8/2007 | Merkh | H04L 63/0227 709/227 |

OTHER PUBLICATIONS

Zisman, "An Overview of XML", Computing and Control Engineering Journal, Aug. 2000, [Online] Downloaded Apr. 18, 2014, http://ieeexplore.ieee.org/stamp/stamp.jsp?tp=&arnumber=866909.

Bolour, "Notes on the Eclipse Plug-in Architecture" 2003, Downloaded Mar. 14, 2011, Verified by Wayback Machine to Jul. 10, 2003, http://replay.waybackmachine.org/20030710042641/http://eclipse.org/articles/Article-Plug-in-architecture/plugin_architecture.html.

Java Basics, "Lesson 2—Data—Student Class", p. 1-2 [Online] Downloaded May 10, 2011. Verified to Dec. 18, 2005 by Wayback Machine. http://replay.web.archive.org/20051218073559/http://ieepoint.net/JavaBasics/oop/oop-20-data-student.html.

* cited by examiner

```
«Java Class»
 World
```

- startTime : Time
- startPlace : Place
- placesInWorld : PlacesInWorld
- characterInWorld : CharacterInWorld
- characterInteractionInWorld : CharacterInteractionInWorld
- objectsInWorld : ObjectsInWorld
- objectInteractionInWorld : ObjectInteractionInWorld
- enumerationsInWorld : EnumerationInWorld
- eventsInWorld : EventsInWorld
- worldPropertyRepository : HashMap
- mapType : WorldMap
- scenarioName : String

- World ( )
- World ( )
- getCharacterInteractionInWorld ( )
- setCharacterInteractionInWorld ( )
- getCharacterInWorld ( )
- setCharacterInWorld ( )
- getEnumerationsInWorld ( )
- setEnumerationsInWorld ( )
- getEventsInWorld ( )
- setEventsInWorld ( )
- getMapType ( )
- setMapType ( )
- getObjectInteractionInWorld ( )
- setObjectInteractionInWorld ( )
- getObjectsInWorld ( )
- setObjectsInWorld ( )
- getPlacesInWorld ( )
- setPlacesInWorld ( )
- getStartPlace ( )
- setStartPlace ( )
- getStartTime ( )
- setStartTime ( )
- getWorldPropertyRepository ( )
- setWorldPropertyRepository ( )
- addWorldPropertyReference ( )
- removeWorldPropertyReference ( )
- queryWorldPropertyReference ( )
- getWorldPropertyReference ( )
- getScenarioName ( )
- setScenarioName ( )

FIG. 3a

INSTRUCTIONAL DESIGN TOOL

FIELD OF THE INVENTION

The invention generally relates to a system and method for computer systems and, more particularly, the invention relates to an instructional design tool.

BACKGROUND OF THE INVENTION

There are methods and tools in the market that can help with capturing knowledge via defined processes, documentation, and knowledge management databases. And, there are a variety of learning strategies and systems ranging from traditional classroom to e-learning to deliver the knowledge.

In a more specific example, Instructional Designers arrange media and content to help learners and teachers transfer knowledge most effectively. The process consists broadly of determining the current state of learner understanding, defining the end goal of instruction, and creating some media-based "intervention" to assist in the transition. Ideally, the process is informed by pedagogically-tested theories of learning and may take place in student-only, teacher-led or community-based settings. The outcome of this instruction may be directly observable and scientifically measured or completely hidden and assumed.

For learning-based systems, Instructional Designers capture knowledge from Subject Matter Experts. This knowledge capture is traditionally acquired through questionnaires. Ideally, this could be an iterative process to refine the knowledge captured. Further, in learning-based games, the knowledge is tied to a gaming scenario. The gaming scenario is based on the knowledge acquired and is traditionally captured in a design document, which is essentially a word document, explaining every movement/action/situation that might happen in a game. Then, a gaming development team refers to the design document to design a game engine, and with the help of a media specialist, media is incorporated into the raw game to make it more attractive, interesting, and engaging.

However, the gaming design document is provided to game development teams in a very high level of abstraction. This high level abstraction tends to be confusing and difficult to interpret. This, in turn, leads to misunderstandings between designers and developers and can significantly slow down the design and development process. Accordingly, there exists a need in the art to overcome the deficiencies and limitations described hereinabove.

SUMMARY OF THE INVENTION

In a first aspect of the invention, an instructional design tool comprises at least one component configured to visually model a gaming scenario using recorded knowledge and graphical content defined by values associated with classes of respective models and translate the defined values into a standardized XML format.

In another aspect of the invention, a system for deploying models of scenario-specific details comprises a computer infrastructure. The computer infrastructure is operable to convert user defined values of classes associated with models into a standardized XML format for implementation in a gaming scenario.

In another aspect of the invention, a method for deploying an instructional design tool comprises providing a computer infrastructure. The computer infrastructure is operable to: capture values of classes associated with a respective pre-defined model of at least one of a character, an object and a world; and translate the values into a standardized XML format In another aspect of the invention, a computer program product for designing an instructional application, comprises: a computer readable media; first program instructions to provide classes associated with a plurality of models; second program instructions to model scenario-specific details based on values provided for at least one class of the classes: and instructions to convert the values into a standardized XML format, wherein the first, second and third program instructions are stored on the computer readable media.

BRIEF DESCRIPTION OF THE DRAWINGS

The present invention is described in the detailed description which follows, in reference to the noted plurality of drawings by way of non-limiting examples of exemplary embodiments of the present invention.

FIGS. 3a-3h illustratively show details of classes of the World Model for implementing aspects of the invention;

DETAILED DESCRIPTION OF EMBODIMENTS OF THE INVENTION

The invention generally relates to an instructional design tool used for designing learning based applications. More specifically, the system and method of the invention includes an instructional design tool configured to use captured expert knowledge (e.g., of trained and/or skilled workers) for translating such knowledge into an environment used for instructional purposes. In embodiments, the instructional design tool uses a standardized XML Schema capable of being used in any number of gaming engines.

In implementation, an Instructional Designer can convey learning scenario designs to gaming development teams more clearly when compared to the traditional word document design method. The communication and design tool of the present invention can thus minimize misunderstandings between designers and developers and can expedite the design and development process by automating steps and providing a number of templates for Instructional Designers to rapidly design learning games.

In embodiments, the instructional design tool is an Eclipse-based Rich Client Platform (RCP) plug-in, with which an Instructional Designer can model the gaming scenario visually. (Eclipse is a trademark of International Business Machines Corp. in the U.S. and throughout the world.) The instructional design tool allows an Instructional Designer to model the learning game by adding scenario-specific details, such as characters, places, objects, interactions, and events, into an instructionally-sound framework without having to spend as much time on design as typically would with the word design document. Furthermore, the instructional design tool automates a feed for the gaming engine layer, which translates this feed and prepares a gaming engine. In this case, the feed is an XML-based document.

Leveraging and creating immersive gaming environments to facilitate knowledge transfer and effective learning using current processes, people resources, and tools, however, has been found to be cost and time prohibitive. However, the present invention has addressed these issues by providing an instructional design tool that allows an Instructional Designer to efficiently model characters, objects, events, communication, and interactions occurring in the learning game. This modeling can be performed through a series of templates, implementing a series of JAVA models (classes). The Instructional Designer can model events based on a timeline or a state of some particular attributes of characters, world, or objects, etc. Moreover, the XML schema generated from the tool can be fed into the gaming engine layer, from which the learning game is produced.

System Environment

Figure 1:
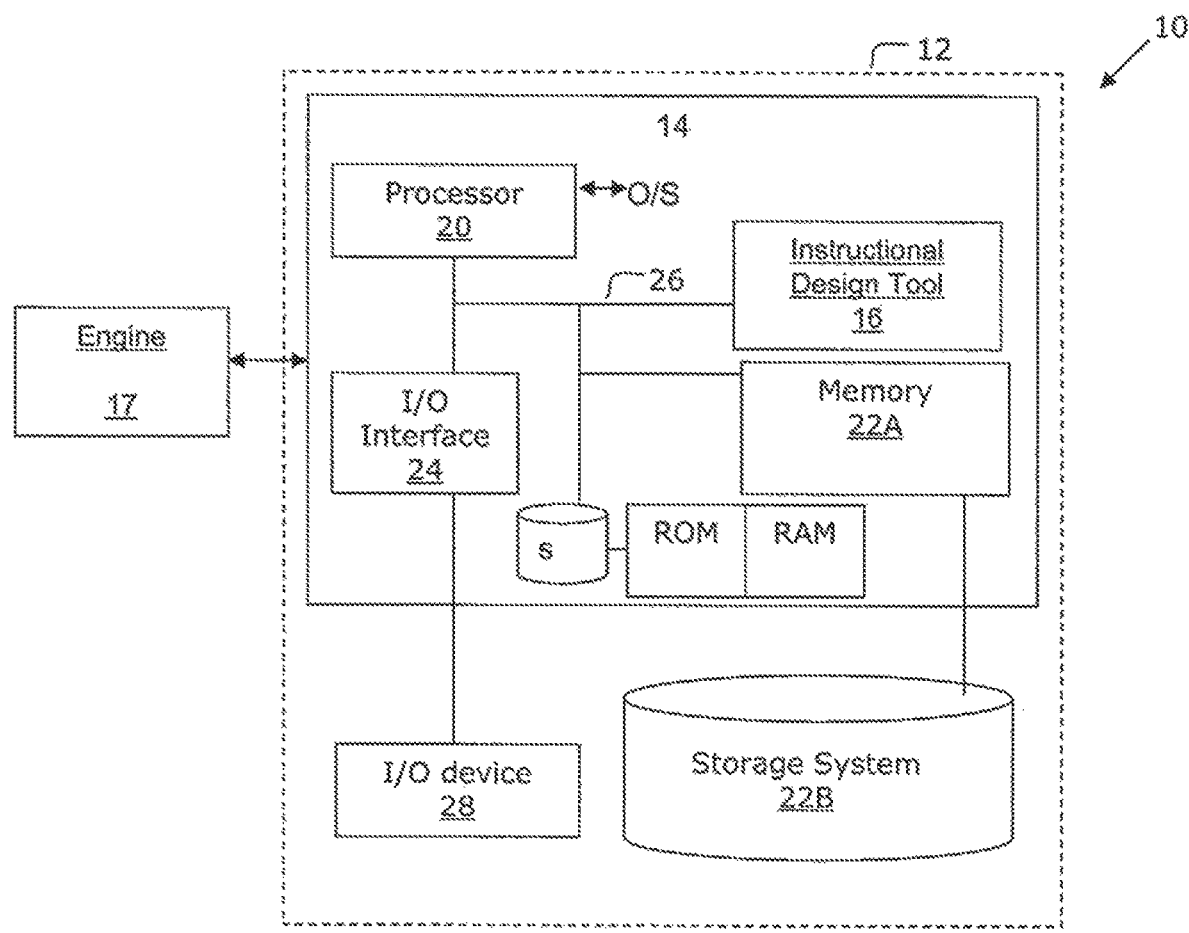
FIG. 1 shows an illustrative environment for implementing aspects of the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an instructional design tool 16, implementing and using a standardized XML schema. The standard XML schema makes it possible to communicate efficiently and effectively across different tools and platforms in accordance with the invention.

The instructional design tool 16 tool encompasses a systematic method to design scenarios in an immersive, interactive and instructional environment. The immersive, interactive and instructional environment is provided by an instructional design of single-player, multi-player, and/or virtual worlds immersive learning games, and a delivery via a variety of gaming engines and platforms that reduces the production time and cost for training. In use, as should be appreciated by those of ordinary skill in the art, the instructional processes of the invention should significantly decrease training time and increase productivity of the less experienced workforce by teaching such workforce in a manner which is more amenable to their learning style.

The instructional design tool 16 is configured to permit an Instructional Designer to visually model a gaming scenario in order to expose and define logical situations "IN GAME". The Instructional Designer will use the knowledge of the expert when designing the visual model, e.g., adding media, graphics, etc. In embodiments, the instructional design tool 16 is an Eclipse-based RCP plug-in and is platform independent. In implementation, the instructional design tool 16 prepares a standardized XML feed for a gaming engine layer. The gaming engine layer is, in embodiments, designed to use the standardized XML-based feed to prepare an Engine 17 (e.g., gaming engine) to deliver the immersive learning and gaming experience in accordance with the invention. The Engine 17 can be either internal or external to the computing device 14. In embodiments, the Engine 17 is platform dependent.

To accomplish such goals, the instructional design tool 16 includes characters' internal and external properties, objects, interactions, etc. as defined and kept track using a series of models using JAVA classes. Once a class or classes are defined (e.g., properties, characters, objects, interactions, worlds, etc.) by the user, each of the character's internal and external properties (objects, interactions, worlds, etc.) may be saved in a library for future use in other scenarios. The library, for example, can be saved in storage 22B. This allows an Instructional Designer to reuse characters' internal and external properties, objects, etc. when designing different scenarios.

An internal property is a characteristic that the gaming engine sets for the character, based upon the Instructional Designer's input into the instructional design tool 16. An external property is a property that is calculated by the viewpoints of other characters in the game. In other words, external properties are constructed by what other characters think about the particular property for the character. In addition, objects have properties which can have associated sets of verbs. Verbs represent the actions that are associated with the object. For example, a telephone object could have the verbs "place call," "pick up," or "listen to voicemail". Similarly, places in-world, character-to-character interactions, character-to-object interactions, and state/time-based events can be modeled in the tool as discussed with reference to FIGS. 2-10.

In embodiments, the characters' internal and external properties, objects, interactions, etc. can be provided by predefined JAVA classes which are provided to the user via a set of templates. The JAVA classes can be, for example, place models, object models, object and place Interaction models, world models and enumeration models, as discussed in more detail below. The user, in the templates, can provide values to each of the classes (define properties, etc.)

The computing device 14 further includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with the external I/O device/resource 28 and a storage system 22B. In the present implementation, the I/O device 28 can be a graphical user interface, which provides the Instructional Designer the means to define, for example, characters, objects, places in-world, character-to-character interactions, character-to-object interactions, and state/time-based events, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to the computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a service provider, such as a Solution Integrator, could offer to perform the processes described herein. In this case, the service provider can create, maintain, deploy, support, etc., a computer infrastructure (e.g., computing infrastructure of FIG. 1) that performs the process steps of the invention for one or more customers. In return, the service provider can receive payment from the customer(s) under a subscription and/or fee agreement.

Exemplary Implementation of the System of the Invention

Figure 2:
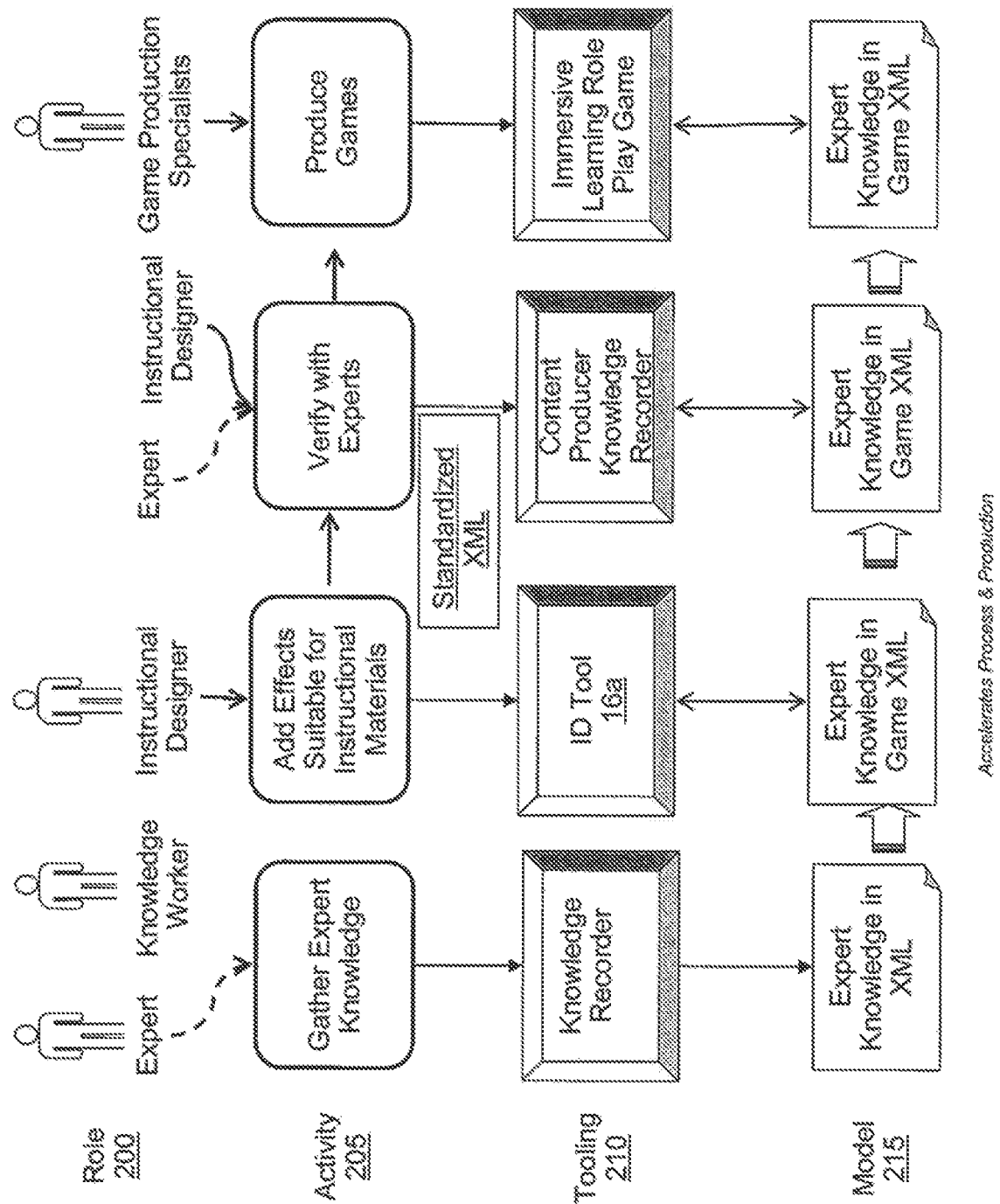
FIG. 2 shows an implementation of an end to end view of the system and method in accordance with the invention.

FIG. 2 shows an implementation of an end to end view of the system in accordance with the invention. FIG. 2 also illustratively shows a high-level swim-lane diagram, implementing processes in accordance with the invention using, for example, the infrastructure shown in FIG. 1. In particular, FIG. 2 shows the specific roles (e.g., users) (200), activities (205), tooling (210) and model (215) for implementing the system and method of the invention.

The roles 200 include: an Expert and/or Knowledge Worker, an Instructional Designer, Expert and/or Instructional Designer and Game Production Specialist. It should be understood that the above noted "users" are only illustrative of the roles used in implementing the invention and that some of the roles (users) can be combined and/or eliminated. For example, the Expert and the Knowledge Worker can be the same user. Also, in embodiments, it should be understood that some of the activities could be combined such as, for example, the adding of effects suitable for instructional materials and the verification with the Expert.

As to the activities 205, in a first of the processes, the system and method of the invention gathers the expert knowledge of the Expert and/or Knowledge Worker. The expert knowledge can be, for example, specific work-related knowledge of the Expert such as different negotiation scenarios, entering information in a database, etc. in a structured environment. The captured knowledge is saved in a standardized XML schema and provided to the instructional design tool 16 for implementing the processes of the invention. The standardized XML schema can contain defined objects such as, for example, master timeline, and places with attributes and characters, all of which should be understood by those of skill in the art. The characters can include, for example, timelines, conversations (with other characters for the purpose of instruction, e.g., a negotiation) and attributes of the characters (e.g., clothing, etc.).

The instructional design tool 16 allows the Instructional Designer to incorporate media and graphics with the recorded expert knowledge. More specifically, the instructional design tool 16 allows the Instructional Designer to visually model the immersive learning environment by adding scenario-specific details using JAVA based models. These scenario-specific details can include characters, places, objects, interactions, and events, all of which are associated with a specific training scenario using the recorded information of the expert. These scenario-specific details with the recorded knowledge are then provided into an instructionally sound learning environment without having to spend as much time on design as he/she typically would with manual interview and documentation methods.

The scenario-specific details can be saved in a standardized XML schema. As the scenario-specific details are saved in a standardized XML schema, the instructional design tool 16 can automate an XML feed for the gaming engine layer, which translates this feed and prepares a gaming engine component. The instructional elements are transferred into a production game using, for example, IBM™ Content Producer™ or Flash or 3D virtual environment. (IBM and Content Producer are trademarks of International Business Machines Corp. in the U.S. and throughout the world.) Also, in embodiments, the Expert and Instructional Designer can collaborate with one another in order to verify the accuracy of the scenario-specific details. The verification process can be implemented using the IBM™ Content Producer™.

Figure 3:
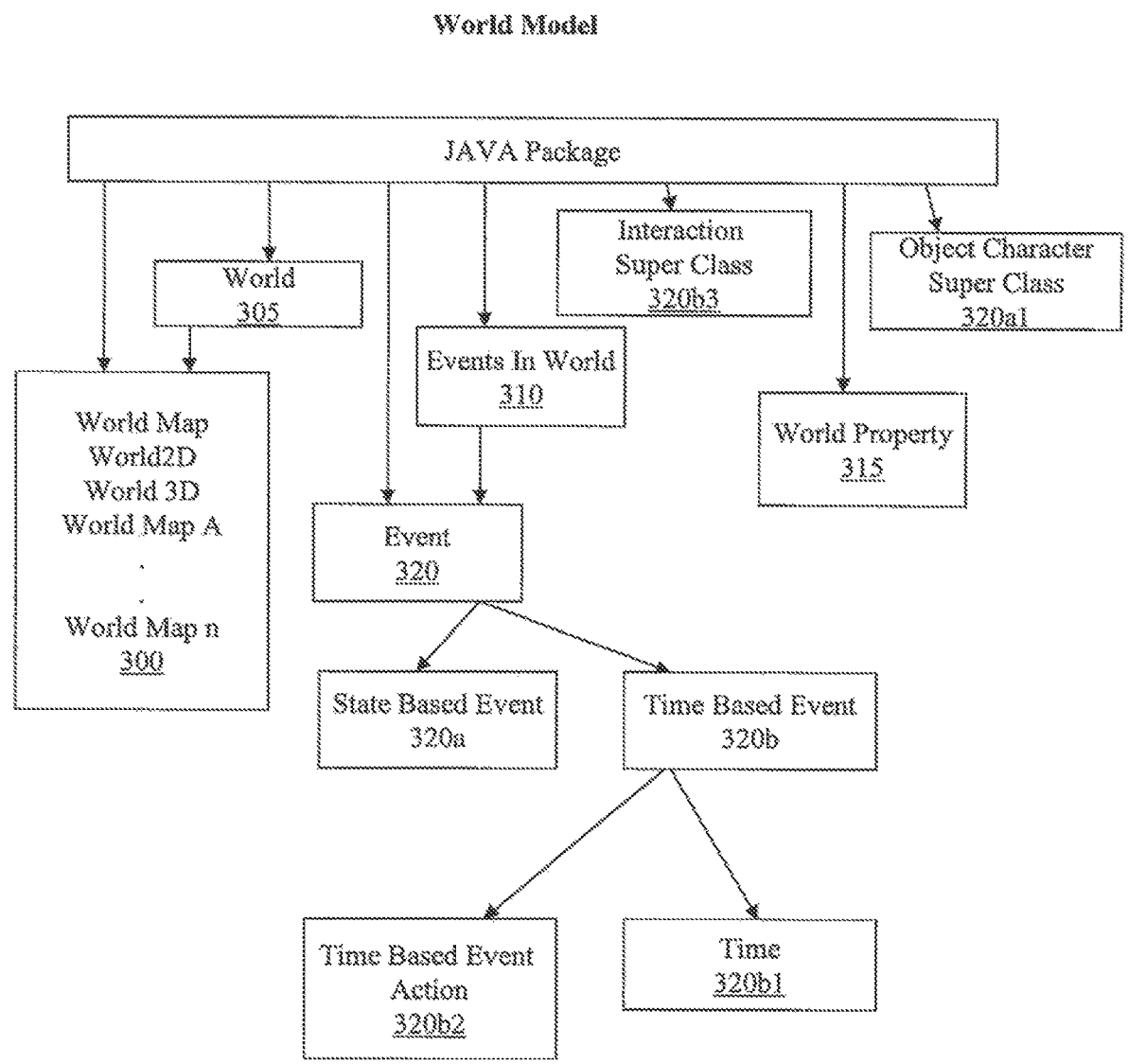
FIG. 3 illustratively shows a World Model for implementing aspects of the invention.
Figure 3B:
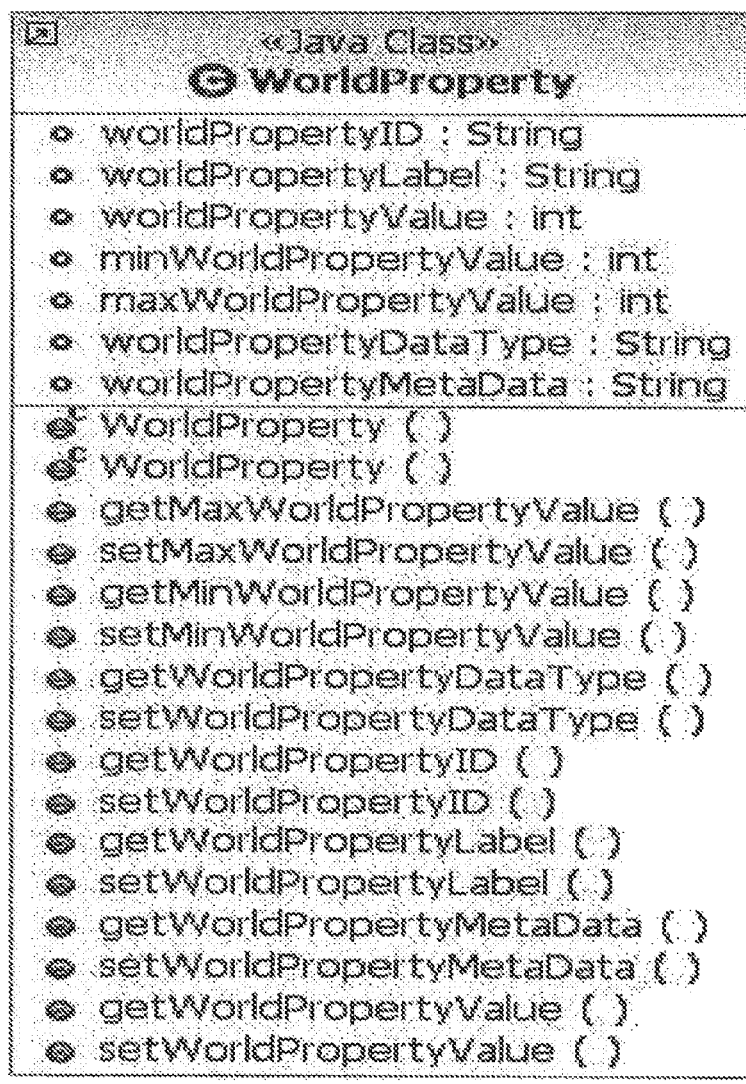
Figure 3C:
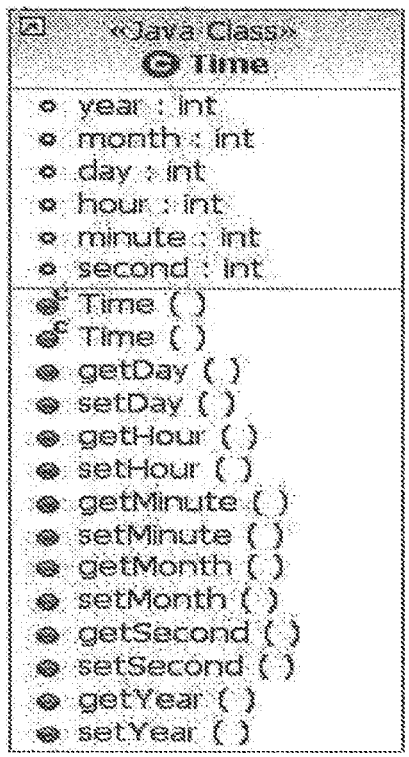
Figure 3D:
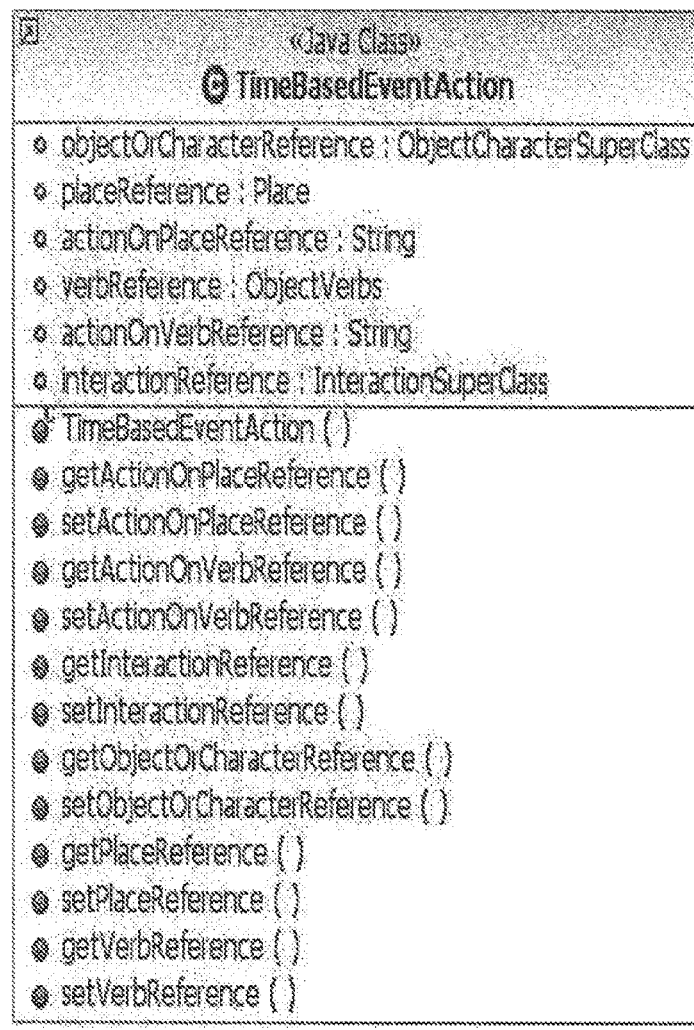
Figure 3E:
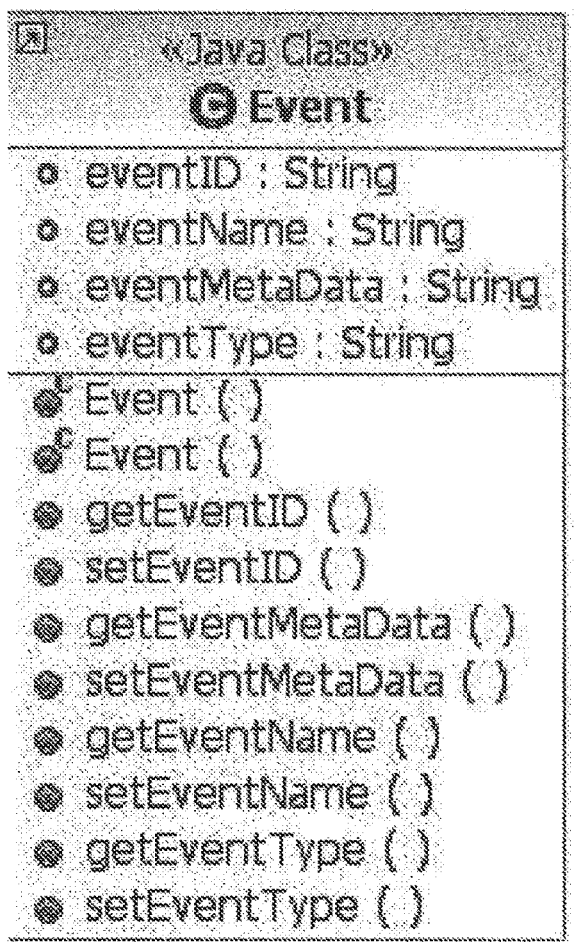
Figure 3F:
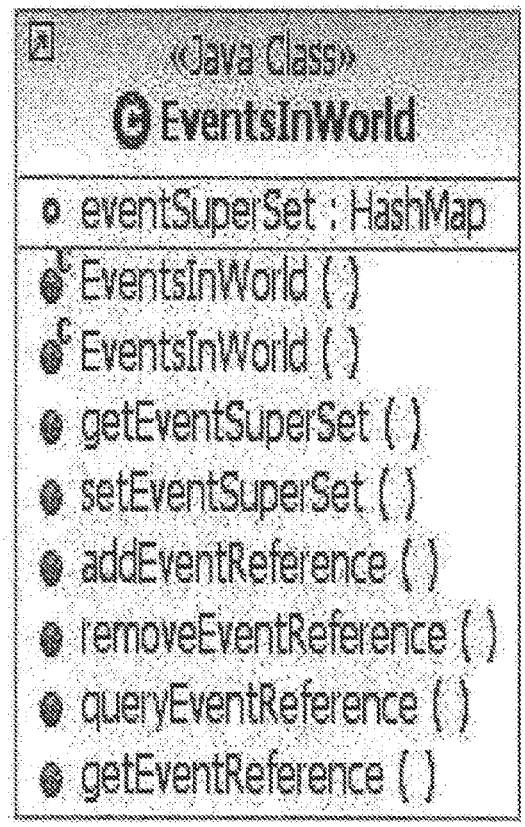
Figure 3G:
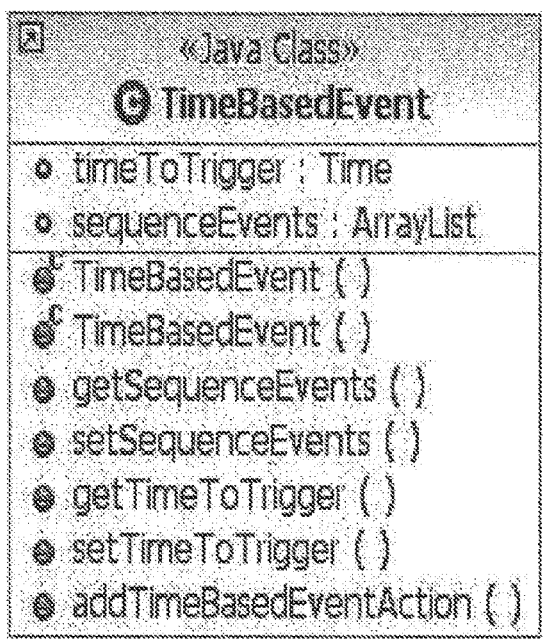
Figure 3H:

FIG. 3 illustratively shows a high level World Model for implementing aspects of the invention. The World Model includes predefined, interrelated JAVA classes such as, for example:

World Map Class 300: This class defines different world maps;

World Class 305: This class defines the properties of the selected world;

Events in World Class 310: This class defines events in the world, whether they are static or dynamic events;

World Property Class 315: This class provides labels and defines the world properties;

Event Class 320: This class defines the events in the world;

State Based Event 320*a* and Time Based Event Class 320*b*: These classes define the static and time based events within the world;

Object Action Super Class 320*a*1: This class defines the actions of objects and characters. This class is the super class for all the objects and characters in the game, basically to track all the characters and objects in the game;

Time Class 320*b*1 and Time base Event Action Class 320*b*2: These classes define the events based on a time line or an action; and Interaction Super Class 320*b*3: This class defines the interactions between, for example, characters. This class is the super class for the interactions character-character or character-object. Using this class all the interactions could be tracked in the game.

FIG. 3 also contemplates other interactions and dependencies amongst the different classes. For example, the Event Class 320 may be directly dependent on the World Class 305. Accordingly, the dependencies and interactions of FIG. 3 (as well as the other classes shown in other models) are only one illustrative example contemplated by the present invention and should not be considered a limiting feature of the invention.

FIGS. 3a-3h illustratively show details of different classes of the World Model for implementing aspects of the invention. It should be understood, though, that the details shown in each of these classes (and all of the classes shown and described herein in other models) are provided as an illustrative example of different parameters used in implementing the invention. As such, the classes and related information provided are one of many different examples that are contemplated by the present invention, and that one of skill in the art would readily understand that other examples can be equally implemented with the present invention.

More specifically, as shown in FIGS. 3a-3h, the World Class is shown to keep track of all the entities in the world. In embodiments, the processes of the invention will keep track of all characters, places and objects from this class. The World Property Class is shown to keep track of all of the properties in the world. The Time Class is shown to set the time parameters inside the world. The Time Based Event Action Class is shown to set the time base events action, inside the world, Time based events actions are the actions which trigger based on the time. The Event Class, Events in World Class, the State Based Event Class and the Time Based Event Class are used to set events inside the class, where the events could be state based events and time based events.

Figure 4:
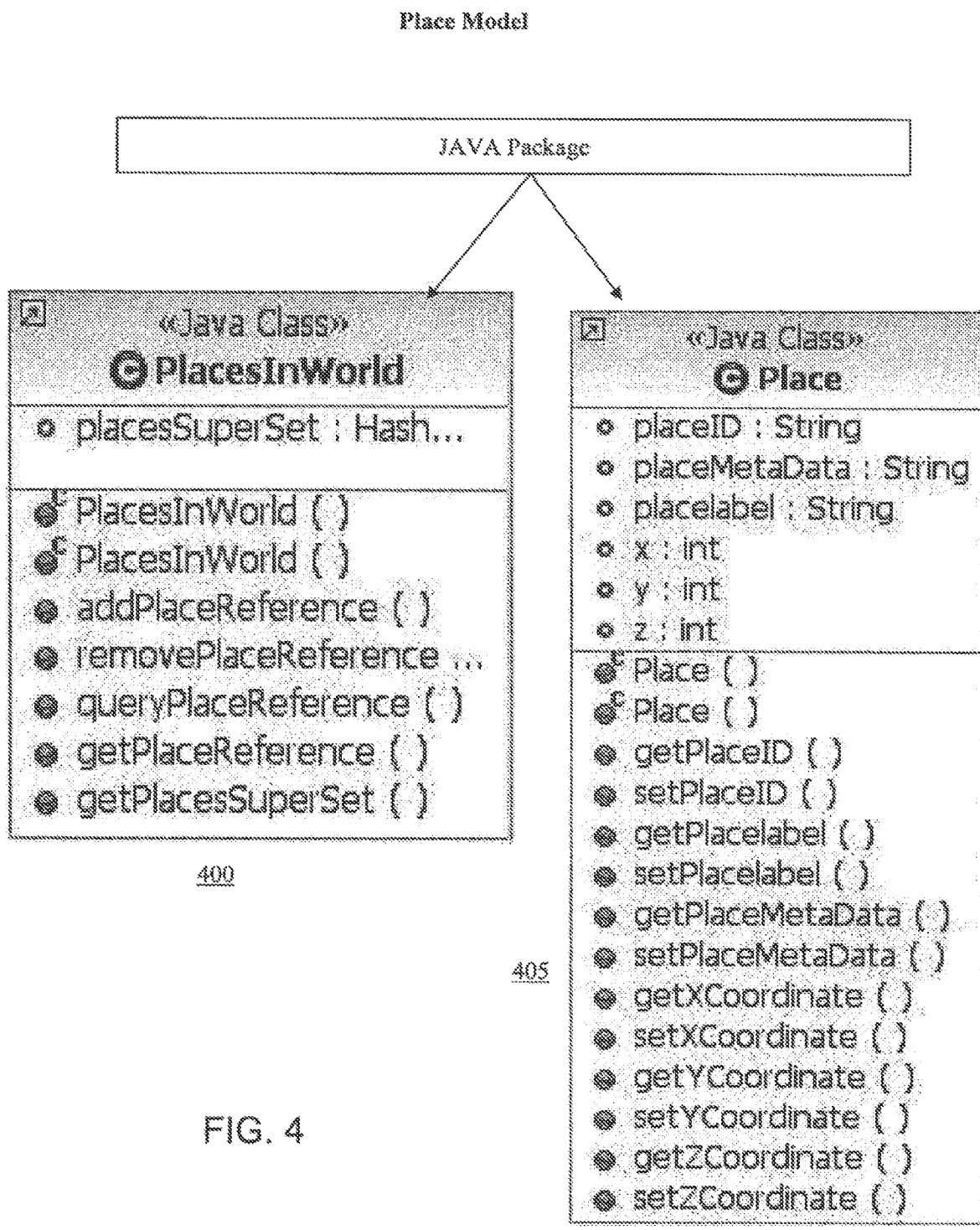
FIG. 4 illustratively shows a Place Model for implementing aspects of the invention.

FIG. 4 illustratively shows a Place Model for implementing aspects of the invention. The Place Model includes Places in World Class 400 and Place Class 405. The Places in World Class 400 is used to track all the places in the world (as soon a new place is added to the game, places in world is updated with a pointed to that place, to track it later); whereas, the Place Class 405 is used to define the actual selected place. In embodiments, the Places in World Class 400 is a place class constructor having parameters and objects to be initialized with ID and Name. MetaData can be read and written using getter and setter methods on this variable. The Place Class 405 can be implemented with attributes as a hash table, where the name will be the id and the value will be the object reference. The places in world class 400 can be implemented with attributes as a hash table, where the name will be id and value will be object reference to Place class 405. In this manner, when an object is referred with an object ID, it is possible to keep track of the places currently present for the game.

As should also be understood by those of skill in the art, any of the classes (shown in FIGS. 3-8e) can be implemented with attributes as a hash table, as well as an array list or node contents, depending on a particular application. Also, each of the objects, worlds, characters, properties, etc. can be defined by an ID and Name, and can be provided with a set of coordinates in the x, y and z plane.

In embodiments, by way of a non-limiting example, the standard XML schema for the Place Model can be written as:

```
<places>
    <place id="plc1" name="entry">
        <metadata>
            <description> Entry of house </description>
        </metadata>
    </place>
    <place id ="plc2" name = "study">
        </metadata>
    </place>
    <place id ="plc3" name = "outside">
        </metadata>
            <description> outside house </description>
    </metadata>
    </place>
</places>
```

Figure 5:
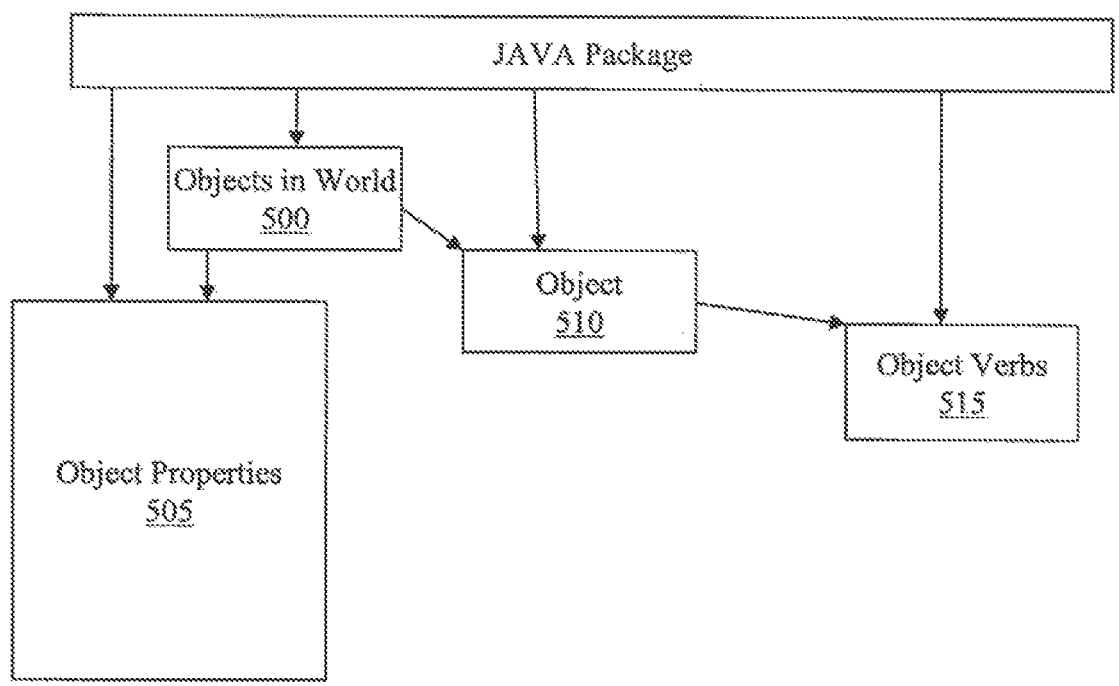
FIG. 5 illustratively shows an Object Model for implementing aspects of the invention.

FIG. 5 illustratively shows a high level Object Model for implementing aspects of the invention. Although certain dependencies and interactions amongst classes are shown in FIG. 5, it should be understood that other interactions and dependencies amongst the different classes are also contemplated by the present invention. The World Object Model includes predefined, interrelated JAVA classes such as, for example:

Objects in World Class 500: This class keeps track of the different objects in the world;

Object Properties Class 505: This class defines the properties of the objects;

Object Class 510: This class defines the objects. More specifically, the Object Class is a representation of objects in the world. Objects can have sub-objects which can be linked to another instance in the class; and Object Verbs Class 515: This class defines actions of the object. The object verb is specific to an object and can be defined by a verb ID. In embodiments, each instance of this class defines a single verb. The verb should preferable have a metadata set. So, at runtime, a designer should know what actions are to be provided at the runtime on the event of this verb.

In embodiments, by way of a non-limiting example, the standard XML schema for the Object Model can be written as:

```
<object id="objsingingman" name="singing man">
    <verbs>
        <verb id="look" name="look"/>
        <verbs>
        </metadata>
            </description> singing guy John Smith<description>
    </verbs>
    </object>
</object>
    <objects>
        <object id="obj" name="telephone">
            <verbs>
                <verb action="">Call</verb>
                <verb action="">Answer</verb>
            </verbs>
            <metadata>
                <description><description>
            </metadata>
        </object>
```

Figure 6:
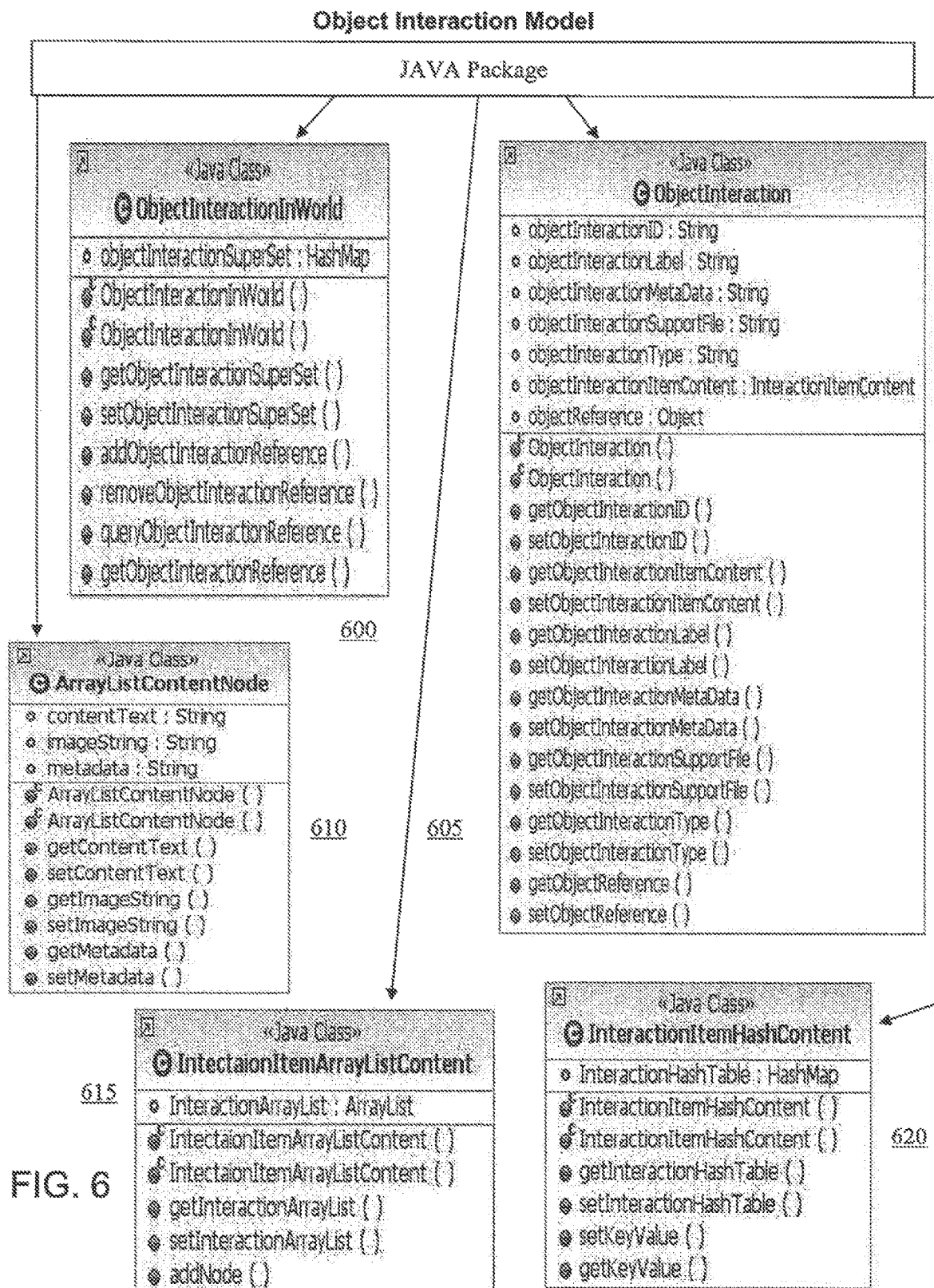
FIG. 6 illustratively shows an Object Interaction Model for implementing aspects of the invention.

FIG. 6 illustratively shows an Object Interaction Model for implementing aspects of the invention. This Object Interaction Model includes the following predefined, interrelated JAVA classes:

Object interaction in World Class 600: This class is a repository for all the object interactions in the world;

Object Interaction Class 605: This class is used to model interactions between a character and objects. These types can be audio, video, JPEG, 2 or 3 dimensional representations, etc.;

Array List Content Node Class 610, Interaction Array List Content Class 615, and Interaction Item Hash Content Class 620: As should be understood by those of ordinary skill in the art, these classes represent different ways of modeling object interactions such as, for example, using hash tables, arrays and content nodes. (Those of skill in the art should understand that any of the classes of any of the models shown in FIGS. 3-8e can be implemented using hash tables, arrays and content nodes.)

Figure 7:
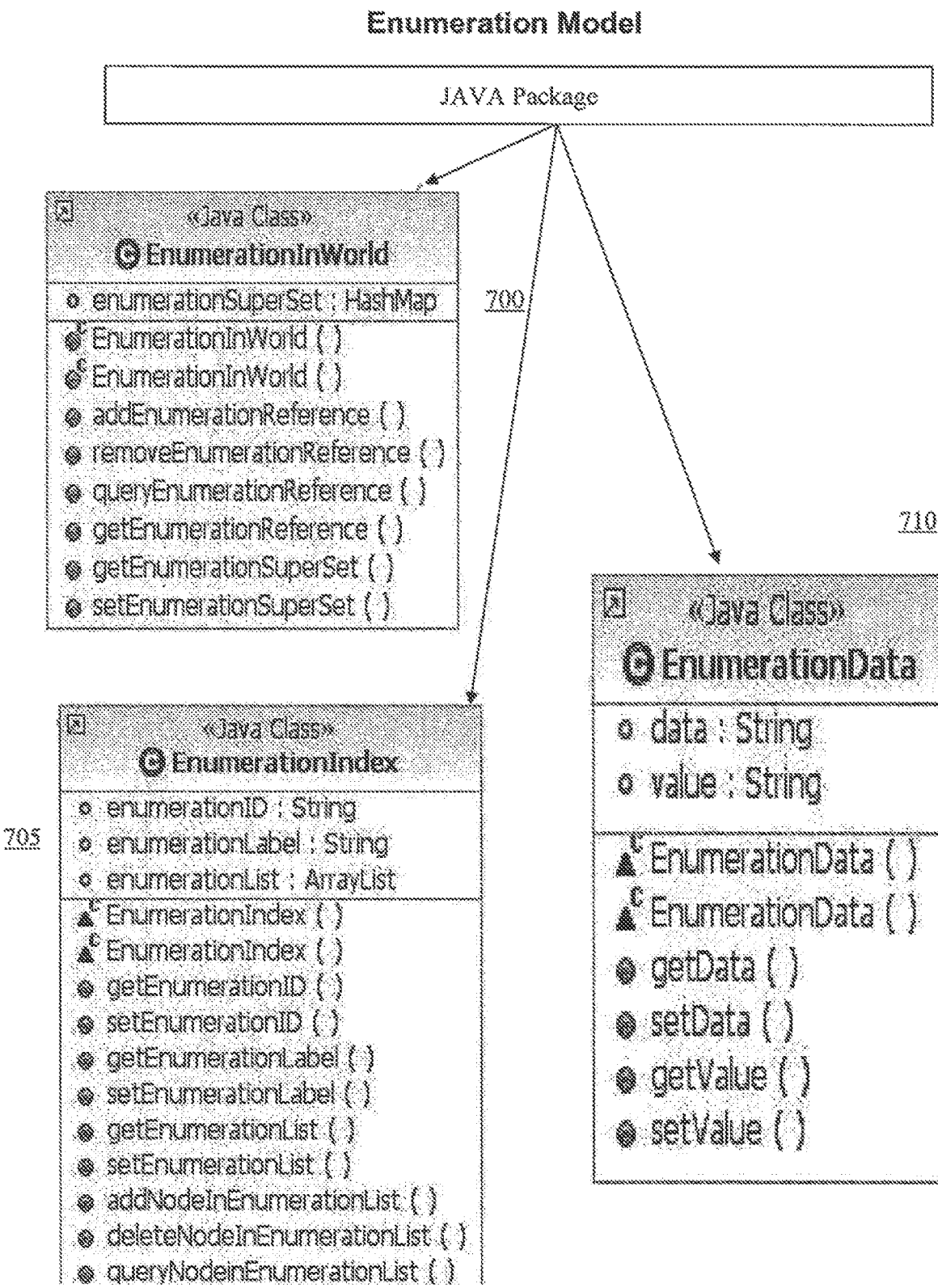
FIG. 7 illustratively shows an Enumeration Model for implementing aspects of the invention.

FIG. 7 illustratively shows an Enumeration Model for implementing aspects of the invention. The Enumeration Model shows classes that are used to represent the enumeration types of data in the world, e.g., a book has five chapters. In this way, each chapter could be represented as data inside enumeration. The Enumeration Model includes the following predefined, interrelated JAVA classes:

Enumeration in World Class 700;
Enumeration Index Class 705; and
Enumeration Data Class 710.

Figure 8:
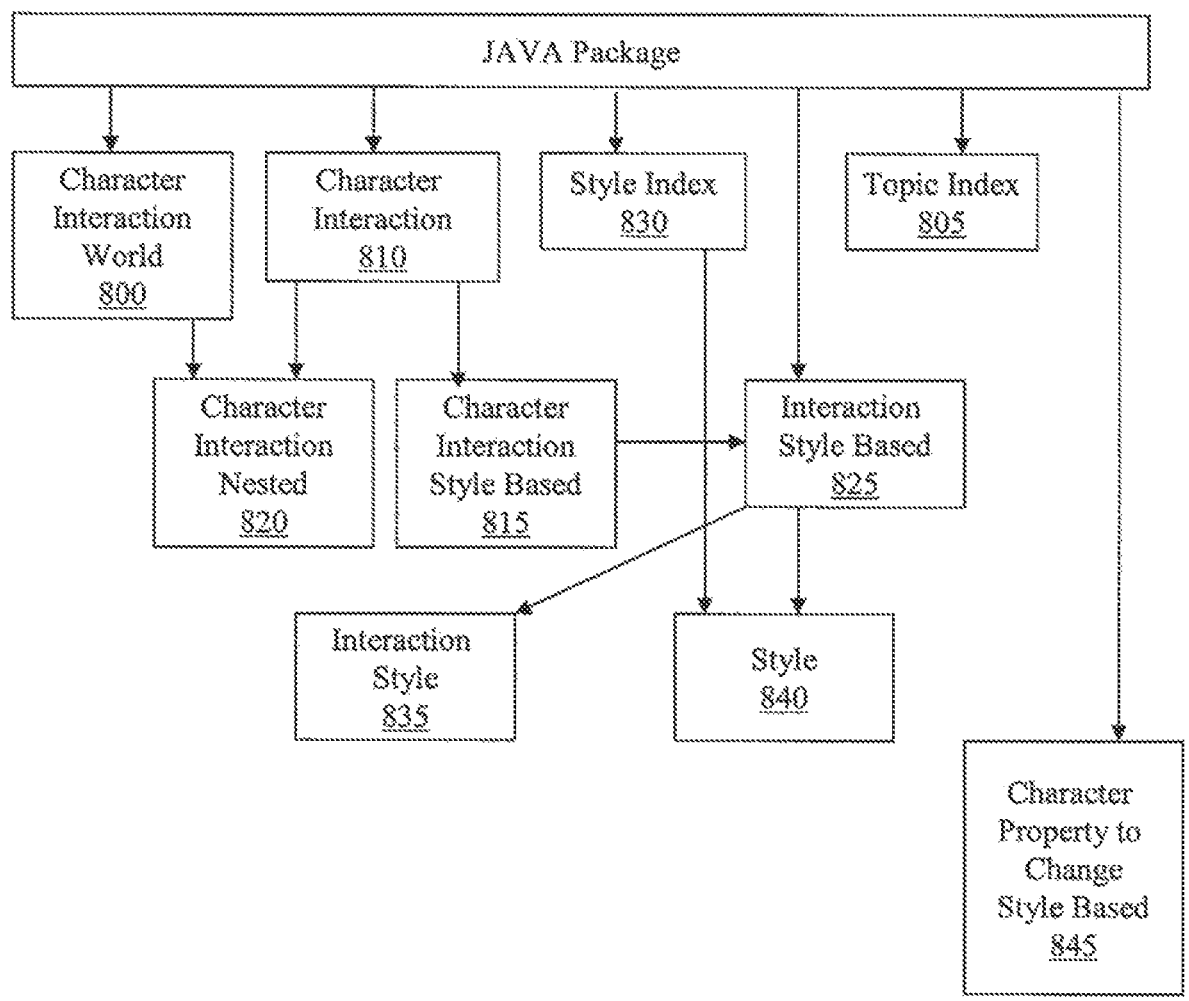
FIG. 8 illustratively shows a Character Interaction Model for implementing aspects of the invention.
Figure 8A:
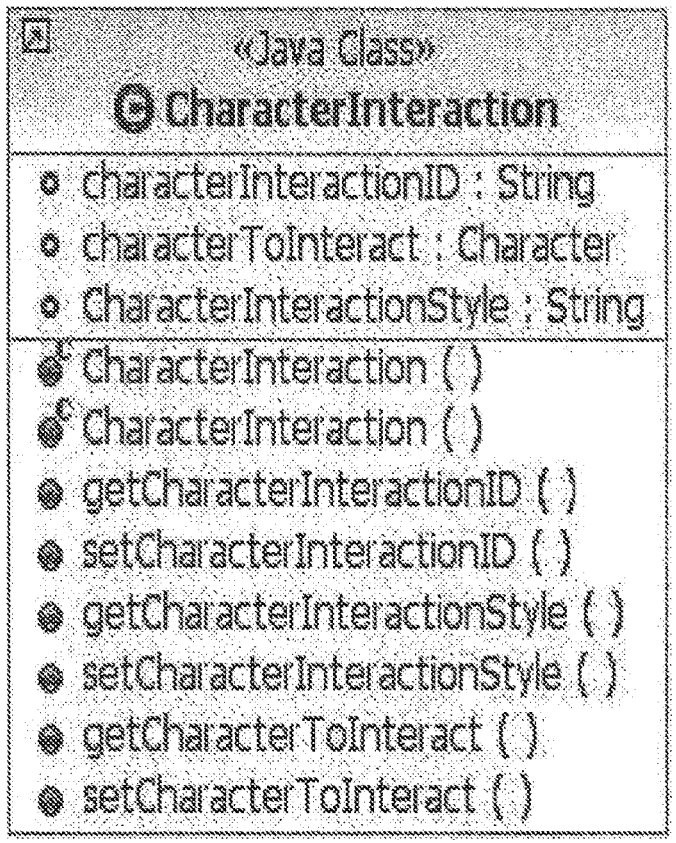
FIGS. 8a-8e illustratively show details of classes of the Character Interaction Model for implementing aspects of the invention.
Figure 8B:
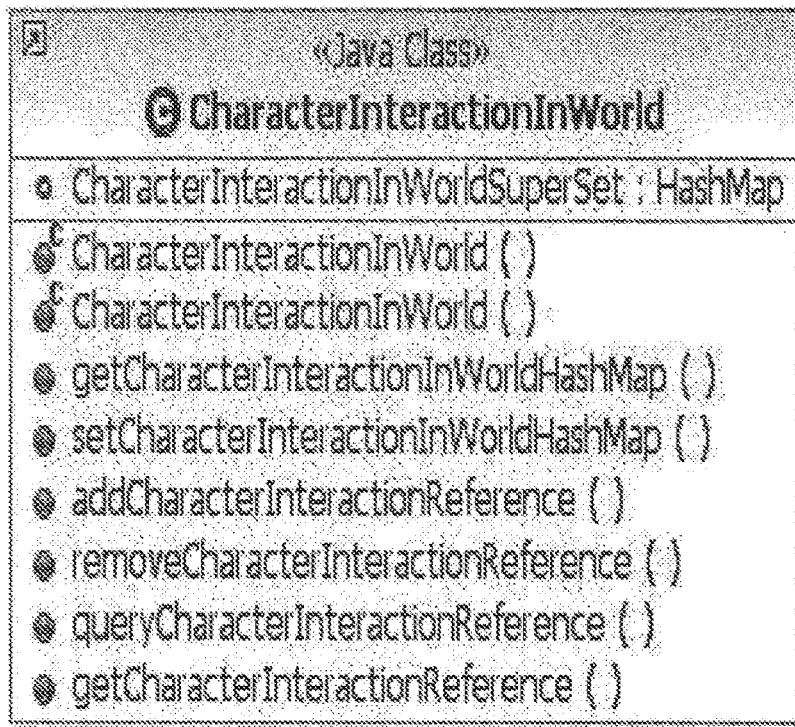
Figure 8C:
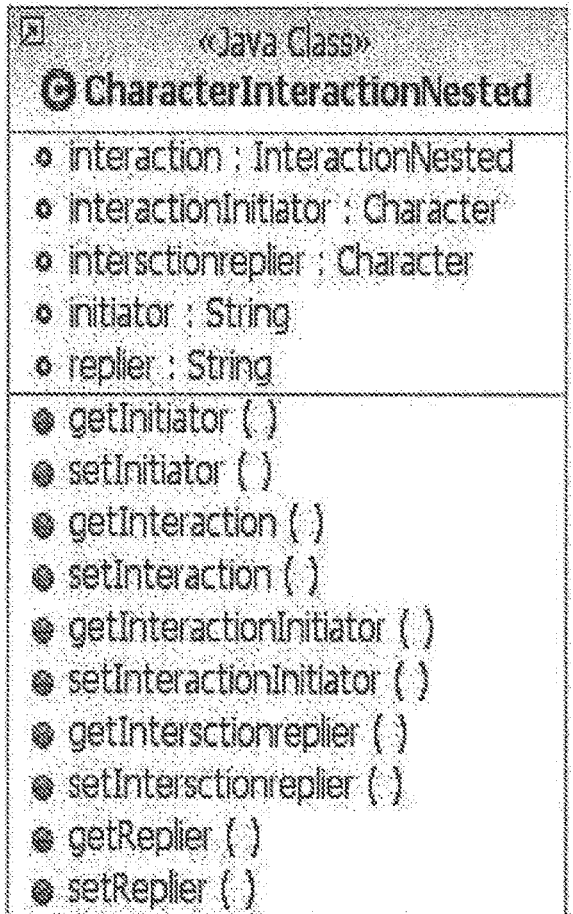
Figure 8D:
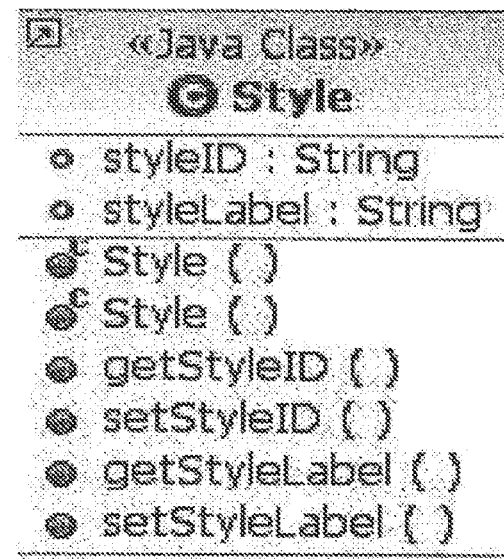
Figure 8E:
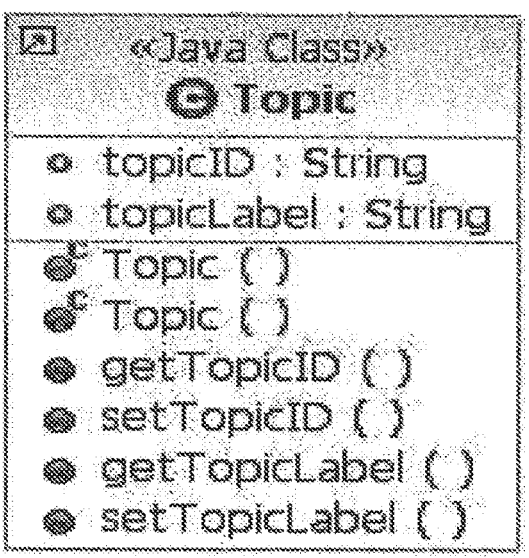

FIG. 8 illustratively shows a high level representation of a Character Interaction Model for implementing aspects of the invention. FIGS. 8a-8e illustratively show details of the classes of the Character Interaction Model for implementing aspects of the invention. More specifically, the Character Interaction Model includes the following predefined, interrelated JAVA classes:

Character Interaction World Class 800: This class is a repository of all the character interactions in the world;
Topic Index Class 805: This class is used to create topics. These topics could be used to model different styles of character interaction;
Character Interaction Class 810: This class is used to create character interaction in the world. In embodiments, the character interaction takes place between two characters in the world such as between a manager and an employee;
Character Interaction Style Based Class 815: This class shows different interaction groupings;
Character Interaction Nested Class 820: This class is used to model interactions in a nested way, based on character property where different paths could be taken for different interactions;
Interaction Style Based Class 825: This class defines the different interactions of the characters;
Style Index Class 830: This class defines the type of interactions such as static, linear, complex, etc. For example, this class can define a telephone ringing, a picking up of the telephone (simple) and a conversation on the telephone (complex), etc.;
Interaction Style Class 835: This class defines a high level interaction of the characters;
Style Class 840: This class is used to create styles. These styles could be used to model different styles of character interaction; and
Character Property to Change Style Based Class 845: This class defines high level properties of the characters.

FIG. 8 also contemplates other interactions and dependencies amongst the different classes. For example, the Interaction Style Class 835 may be directly dependent on the Character Interaction Style Based Class 815. Accordingly, as with all of the classes shown herein, the dependencies, definitions, interactions, etc. of FIG. 8 are only one illustrative example contemplated by the present invention.

Exemplary Templates and Uses in Accordance with the Invention

Figure 9:
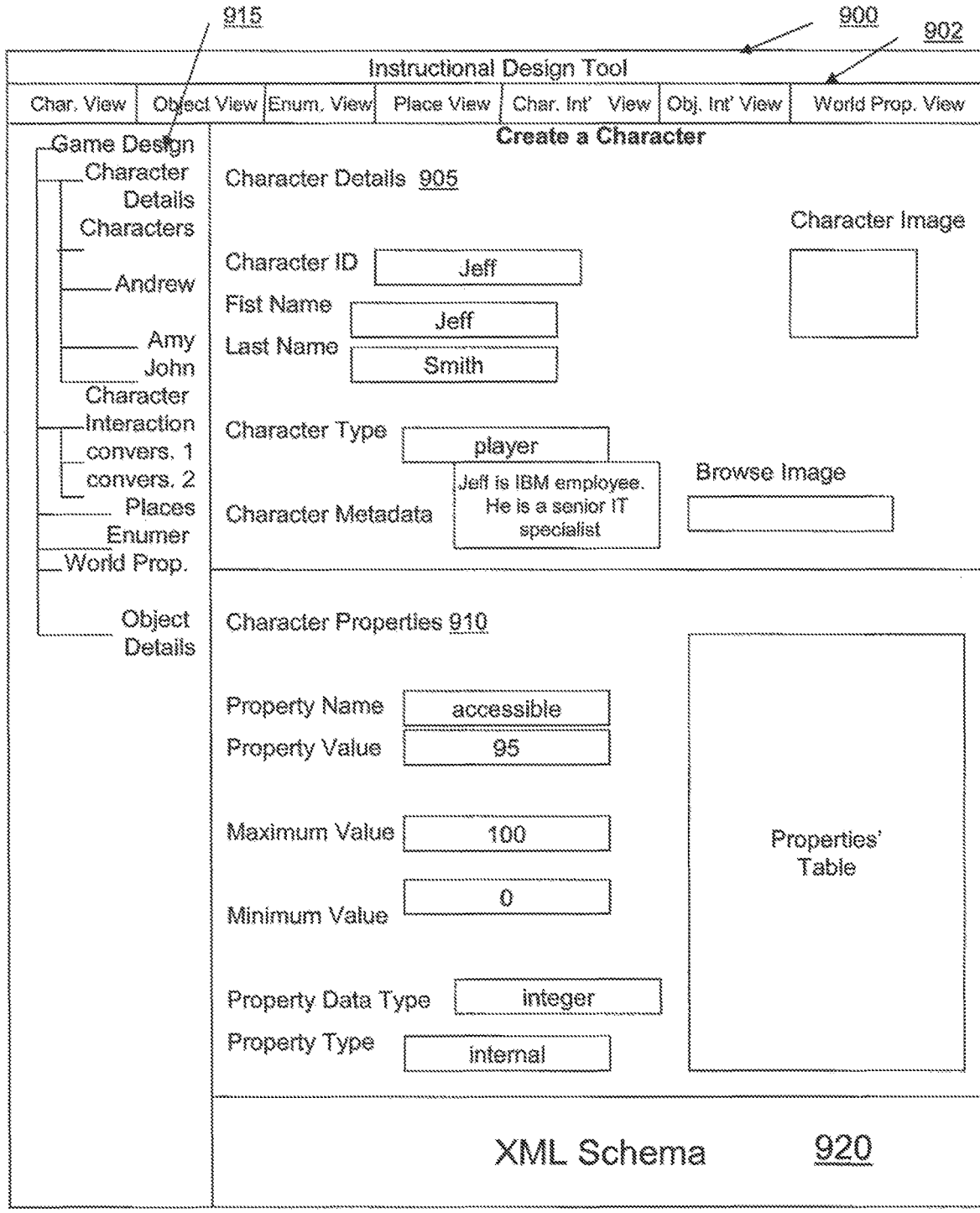
FIGS. 9 and 10 show templates (graphical user interfaces) implementing aspects of the invention.
Figure 10:
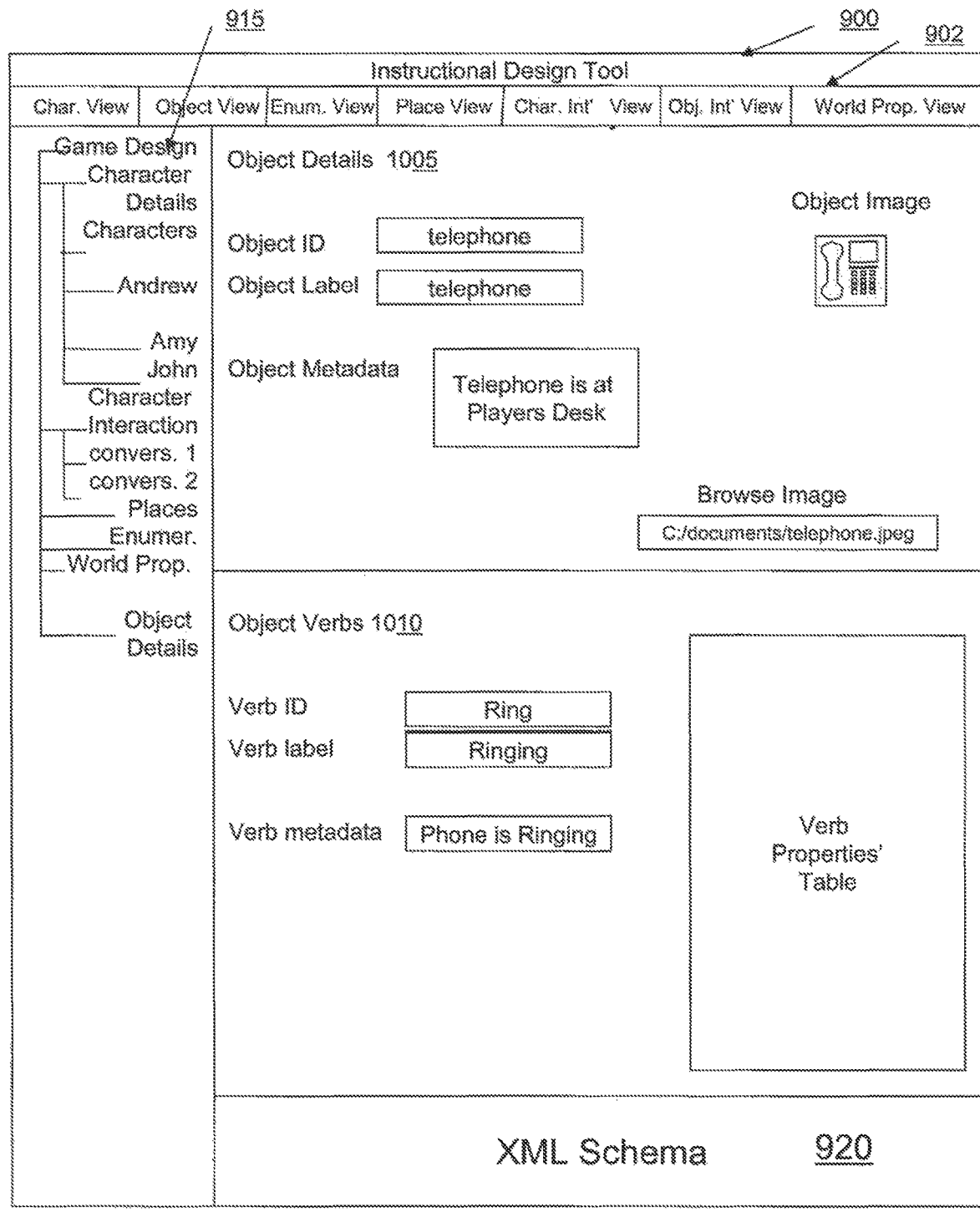

FIGS. 9 and 10 show templates (graphical user interfaces) implementing aspects of the invention. The templates for various different work-related scenarios are represented, in the illustrative implementation of FIGS. 9 and 10, by reference numeral 900. The template of FIGS. 9 and 10 include tabs 902, which are related to the different models (classes) outlined in FIGS. 3-8e. The tabs 902 are selectable by the user in order to generate a template associated with the particular selected model.

In the illustrative example of FIG. 9, the user selected the "Character View Model" tab, which generated a template including the fillable fields associated with Character Details 905 and Character Properties 910. In use, the user can enter values into the fillable fields. The Character Details 905 include the following fillable fields:

Character Image;
Character ID;
first Name;
Last Name;
Character Type;
Browse Image; and
Character Metadata.

The Character Properties 910 include the following fillable fields:

Property Name;
Property Value;
Maximum Value;
Minimum Value;
Property Data Type; and
Property Type.

As further shown in FIG. 9, the Character Model and its classes (and other Models and classes) are represented in a hierarchical format in field 915. As such, it is also possible to select any of the models or classes in field 915, to generate a template. Also, the models and classes shown in field 915 may also be representative of saved and/or predefined definitions, tasks, interactions, etc. in the respective classes. As the classes may be saved with the values, the user can simply select one or more of the classes in field 915, which will automatically provide a template with the fillable fields completed. This will allow the user to more easily create scenarios, based on previously saved data. Also, as the fields are completed, or thereafter, the completed information is converted into a standardized XML schema, which is shown in field 920. The values entered into the fields may also be saved for other scenarios.

In the illustrative example of FIG. 10, the user selected the "Object Model" tab, which generated a template including the fillable fields associated with Object Details 1005 and Object Verbs 1010. In use, the user can enter values into the fillable fields. The Object Details 1005 include the following fillable fields:

Object ID;
Object Label;
Object Metadata;
Browse Image; and
Object Image.

The Object Verbs 1010 include the following fillable fields:
Verb ID
Verb label; and
Verb metadata.

As further shown in FIG. 10, the Object Model and its classes (and other Models and classes) are represented in a hierarchical format in field 915. As such, it is also possible to select any of the models or classes in field 915, to generate a template. Also, the models and classes shown in field 915 may also be representative of saved and/or predefined classes. As the classes may be saved with the values, the user can simply select one or more of the classes in field 915, which will automatically provide a template with the fillable fields completed. This will allow the user to more easily create scenarios, based on previously saved data. Also, as the fields are completed, or thereafter, the completed information is converted into a standardized XML schema, which is shown in field 920. The values entered into the fields may also be saved for other scenarios.

In use, the Instructional Design can be brought through different types of activities via the templates. So, for example, the Instructional Designer can define worlds, characters, objects, and interactions and actions of the worlds, objects, characters, etc. as discussed throughout the present disclosure using the models and classes of, e.g., FIGS. 3-8e. Once the Instructional Designer defines the objects, characters, worlds, interactions, etc. this information can be converted into a standardized XML format. The XML schema can then be fed, seamlessly, into the gaming engine, in the context of the working/instructional scenario with the recorded expert knowledge. In this way, the gaming designer can create a game, with little or no further information required from either the Expert or the Instructional Designer.

Exemplary Processes in Accordance with the Invention

The processes described herein may be implemented on computer program code in combination with the appropriate hardware as described with reference to FIG. 1. This computer program code may be stored on storage media such as a diskette, hard disk, CD-ROM, DVD-ROM or tape, as well as a memory storage device or collection of memory storage devices such as read-only memory (ROM) or random access memory (RAM) (see, e.g., element 22B). Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention. The computer infrastructure may take the form, for example, of the environment of FIG. 1. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While the invention has been described in terms of embodiments, those skilled in the art will recognize that the invention can be practiced with modifications and in the spirit and scope of the appended claims.

What is claimed is:

1. An instructional design tool comprising:
   at least one component implemented in a computer infrastructure configured to:
      visually model a gaming scenario by adding scenario specific details comprising graphical content defined by values associated with classes of respective models to one or more objects included within a standardized XML schema, wherein the respective models include a world model having object interactions including hash tables, arrays, and content nodes, enumeration types of data in a world, world property repository including labels and definitions of world properties, an event superset including static based events, time based events, and dynamic action based events, and a world map class that defines different world maps, wherein the standardized XML schema includes the one or more objects derived from recorded knowledge; and
      translate the added scenario specific details for the one or more objects into the standardized XML schema such that an XML feed including the standardized XML schema is automatically generated for use by a gaming layer, wherein the gaming layer uses the automatically generated XML feed to prepare a gaming engine for producing a learning game; and
   a graphical user interface configured to:
      generate a template including fillable fields comprising values used to define the graphical content of a selected model or classes for the added scenario specific details, such that the template provides the graphical content incorporated with the one or more objects derived from the recorded knowledge;
      generate a first hierarchical format field comprising predefined definitions, tasks, and interactions in respective classes of the selected model such that a selection of one or more of the respective classes automatically provides the template with the fillable fields being completed;
      generate a second hierarchical format field based on a selection of an object model tab, the second hierarchical format field comprising another template including object details which comprise a first set of fillable fields including object identification, object label, object metadata, browse image, and object image and object verbs which comprise a second set of fillable fields comprising a verb identification, a verb label, and a verb metadata; and
      receive the values as input in the fillable fields, wherein the values provide information for the added scenario specific details.

2. The instructional design tool of claim 1, wherein the recorded knowledge and the scenario specific details are transferable to the gaming engine for creating the learning game by a game designer via the standardized XML schema and the world model further comprises a world class that defines properties in a selected world, an events in the world class that defines events in the world, and a world property class that provides labels and defines world properties.

3. The instructional design tool of claim 1, further comprising converting the completed fillable fields to the standardized XML schema which is displayed in a separate field in the graphical user interface,
   wherein the template includes selectable tabs each of which are associated with a different model of the respective models.

4. The instructional design tool of claim 1, wherein the respective models further include at least one of Place Model; Object Model; Object Interaction Model; Enumeration Model; and Character Interaction Model, each of which provide classes to define at least one of characters, properties of characters, objects, interactions of the objects, interactions of characters and places.

5. The instructional design tool of claim 1, wherein the at least one component is platform independent.

6. The instructional design tool of claim 1, wherein the at least one component models the gaming scenario by defining the scenario specific details including characters, places, objects, interactions, and events, based on the classes.

7. The instructional design tool of claim 1, wherein the at least one component defines and keeps track of characters' internal and external properties, objects, and interactions via a series of models using JAVA classes which comprise a world map class, a world class, a plurality of events in the world class, a world property class, an event class, a state based event class, a time based event class, an object action super class, a time class, a time based event action class, and an interaction super class.

8. The instructional design tool of claim 1, wherein the at least one component is maintained on the computer infrastructure by a service provider for a fee.

9. The instructional design tool of claim 1, wherein the at least one component is configured to incorporate media and the graphical content with the one or more objects derived from the recorded knowledge and convert the media and the graphical content into the standardized XML schema.

10. A system for deploying models of scenario specific details, comprising:
a computer infrastructure operable to:
add the scenario specific details comprising graphical content defined by values associated with classes of respective models to one or more objects included within a standardized XML schema, wherein the respective models include a world model having object interactions including hash tables, arrays, and content nodes, enumeration types of data in a world, world property repository including labels and definitions of world properties, an event superset including static based events, time based events, and dynamic action based events, and a world map class that defines different world maps, wherein the standardized XML schema includes the one or more objects derived from recorded knowledge;
create the scenario specific details from received values; and
convert the scenario specific details into the standardized XML schema for implementation in a gaming scenario such that an XML feed including the standardized XML schema is automatically generated for use by a gaming layer, wherein the gaming layer uses the automatically generated XML feed to prepare a gaming engine for producing a learning game,
wherein the adding comprises generating a first hierarchical format field comprising predefined definitions, tasks, and interactions in respective classes of a selected model such that a selection of one or more of the respective classes automatically provides a template with fillable fields being completed and a second hierarchical format field based on a selection of an object model tab, the second hierarchical format field comprising another template including object details which comprise a first set of fillable fields including object identification, object label, object metadata, browse image, and object image and object verbs which comprise a second set of fillable fields including a verb identification, a verb label, and a verb metadata.

11. The system of claim 10, further comprising converting the completed fillable fields to the standardized XML schema which is displayed in a separate field in the graphical user interface,
wherein the computer infrastructure is at least one of maintained, deployed, supported and created by a service provider for a fee.

12. The system of claim 10, wherein the adding comprises:
generating the template including the fillable fields comprising values used to define the graphical content of the selected model or classes for the scenario specific details, such that the template provides the graphical content incorporated with the one or more objects derived from the recorded knowledge; and
receiving the values as input in the fillable fields, wherein the values provide information for the added scenario specific details, wherein the template has selectable tabs associated with the models.

13. The system of claim 10, wherein the models of the scenario specific details are automatically fed to a gaming model layer via the standardized XML schema.

14. The system of claim 10, wherein the computer infrastructure is operable to save the values in a library for future use.

15. The system of claim 10, wherein the computer infrastructure is platform independent.

16. The system of claim 10, wherein the models further include at least one of Place Model; Object Model; Object Interaction Model; Enumeration Model; and Character Interaction Model.

17. The system of claim 10, wherein:
the models and the classes in a field are representative of at least one of saved and predefined values in the respective models and the respective classes, and are selectable to generate a template comprising the at least one of saved and the predefined values; and
the classes comprise a style index class defining at least one type of an interaction in a gaming world as at least one of static, linear, simple, and complex.

18. A method for deploying an instructional design tool comprising:
providing a computer infrastructure being operable to:
capture scenario specific details for one or more objects included in a standardized XML schema, wherein:
the scenario specific details comprise graphical content defined by values of classes associated with respective predefined models of at least one of a character, an object and a world, wherein the respective predefined models include a world model having object interactions including hash tables, arrays, and content nodes, enumeration types of data in a world, world property repository including labels and definitions of world properties, an event superset including static based events, time based events, and dynamic action based events, and a world map class that defines different world maps,
generate a first hierarchical format field used to define the graphical content comprising predefined definitions, tasks, and interactions in respective classes of a selected model such that a selection of one or more of the respective classes automatically provides a template with fillable fields being completed;
generate a second hierarchical format field based on a selection of an object model tab, the second hierarchical format field comprising another template including object details which comprise a first set of fillable fields including object identification, object label, object metadata, browse image, and object image and object verbs which comprise a second set of fillable fields including a verb identification, a verb label, and a verb metadata;
receive values as input from the fillable fields, wherein the values provide information for the captured scenario specific details, the information comprising definitions and actions for the one or more objects;
create the scenario specific details from received values; and
translate the scenario specific details into the standardized XML schema such that an XML feed including the standardized XML schema is automatically generated for use by a gaming layer, wherein the gaming layer uses the automatically generated XML feed to prepare a gaming engine for producing a learning game.

19. The method of claim 18, further comprising converting the completed fillable fields to the standardized XML schema which is displayed in a separate field in the graphical user interface,
wherein the computer infrastructure is at least one of maintained, deployed, supported and created by a service provider.

20. The method of claim 18, wherein the predefined models are transferable to the gaming layer via the standardized XML schema.

21. The method of claim 18, wherein:
the predefined models and the classes in a field are representative of at least one of saved and predefined values in the respective models and the respective classes, and are selectable to generate a template comprising the at least one of saved and predefined values; and
the classes comprise a style index class defining at least one type of an interaction in the world as at least one of static, linear, simple, and complex.

22. A computer program product for capturing knowledge, the computer program product comprising:
a non-transitory tangible computer readable hardware storage memory;
program instructions to provide classes associated with a plurality of models, the classes comprising a style index class defining at least one type of an interaction in a gaming world as at least one of static, linear, simple, and complex, wherein the plurality of models include a world model having object interactions including hash tables, arrays, and content nodes, enumeration types of data in a world, world property repository including labels and definitions of world properties, an event superset including static based events, time based events, and dynamic action based events, and a world map class that defines different world maps;
program instructions to generate a first hierarchical format field on a graphical user interface comprising predefined definitions, tasks, and interactions in respective classes of a selected model of the plurality of models;
program instruction to generate a second hierarchical format field based on a selection of an object model tab, the second hierarchical format field comprising another template including object details which comprise a first set of fillable fields including object identification, object label, object metadata, browse image, and object image and object verbs which comprise a second set of fillable fields including a verb identification, a verb label, and a verb metadata;
program instructions to automatically provide a template with fillable fields being completed in response to a selection of one or more of the respective classes of the selected model;
program instructions to receive values as input from fillable fields, wherein the values provide information for scenario specific details, comprising definitions and actions for one or more objects; and
program instructions to save the scenario specific details in a standardized XML schema such that an XML feed including the standardized XML schema is automatically generated for use by a gaming layer, wherein the gaming layer uses the automatically generated XML feed to prepare a gaming engine for producing a learning game;
wherein the program instructions are stored on the non-transitory tangible computer readable hardware storage memory.

23. The computer program product of claim 22, further comprising converting the completed fillable fields to the standardized XML schema which is displayed in a separate field in the graphical user interface,
wherein the plurality of models and the classes in the field are representative of at least one of saved and predefined values in the respective plurality of models and the respective classes, and are selectable to generate a template comprising the at least one of saved and predefined values.

* * * * *